May 25, 1937.   R. R. GLEN   2,081,743
CENTRIFUGAL CLUTCH
Filed Nov. 8, 1935   2 Sheets-Sheet 1

INVENTOR
Robert Rodger Glen
BY
Watson, Bristol, Johnson & Leavenworth
ATTORNEYS

May 25, 1937.  R. R. GLEN  2,081,743
CENTRIFUGAL CLUTCH
Filed Nov. 8, 1935  2 Sheets-Sheet 2
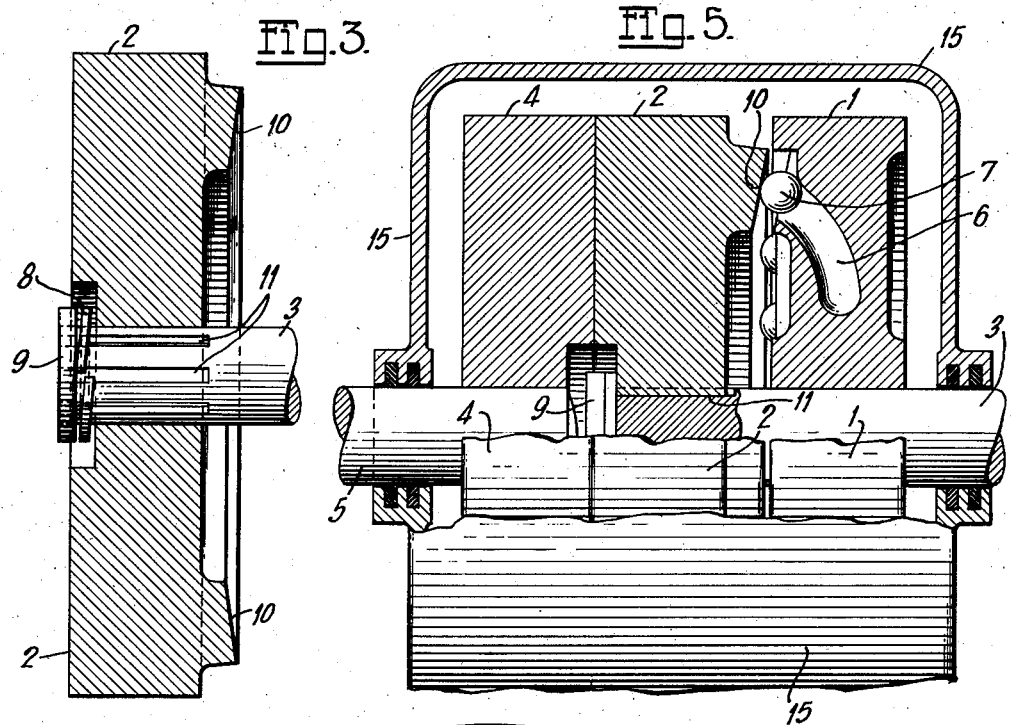
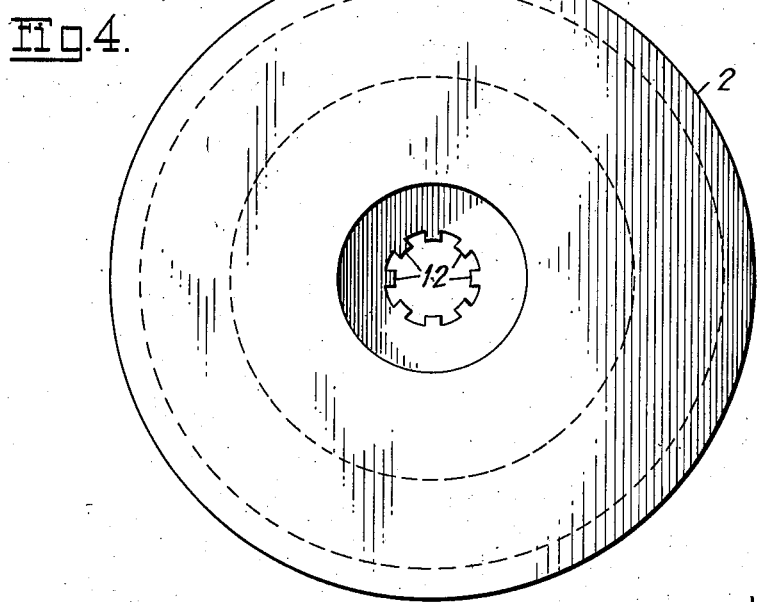
INVENTOR
Robert Rodger Glen
BY
Watson, Bristol, Johnson & Leavenworth
ATTORNEYS Patented May 25, 1937

2,081,743

UNITED STATES PATENT OFFICE 2,081,743

CENTRIFUGAL CLUTCH

Robert Rodger Glen, Biarritz, France, assignor to Glen's Patents and Holdings, Inc., New York, N. Y., a corporation of Delaware Application November 8, 1935, Serial No. 48,877
In Great Britain May 27, 1935

3 Claims. (Cl. 192—105)

This invention relates to centrifugal clutches and has for its object generally to provide an improved construction and arrangement of parts which is efficient, economical and readily manufactured.

More particularly, it relates to a centrifugal clutch which has the driving and driven members positively connected by rolling members in a manner which is positive and precise and effects a positive coupling action.

Another object is to provide rotatable disks or flywheels which carry the rolling members in a manner such as to get a high degree of positive clutching action from a relatively small number of working parts.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention reference should be had to the following detailed description taken in connection with the accompanying drawings, in which:

Fig. 1 is a cross section of the mechanism on the line I—I in

Fig. 2 which is an elevation of one of the disks shown in Fig. 1;

Fig. 3 is a cross section showing another of the disks in Fig. 1 in position on the driving shaft;

Fig. 4 is an elevation of the disk shown in Fig. 3; and

Fig. 5 is a fragmentary view showing a modified form.

Figure 1:
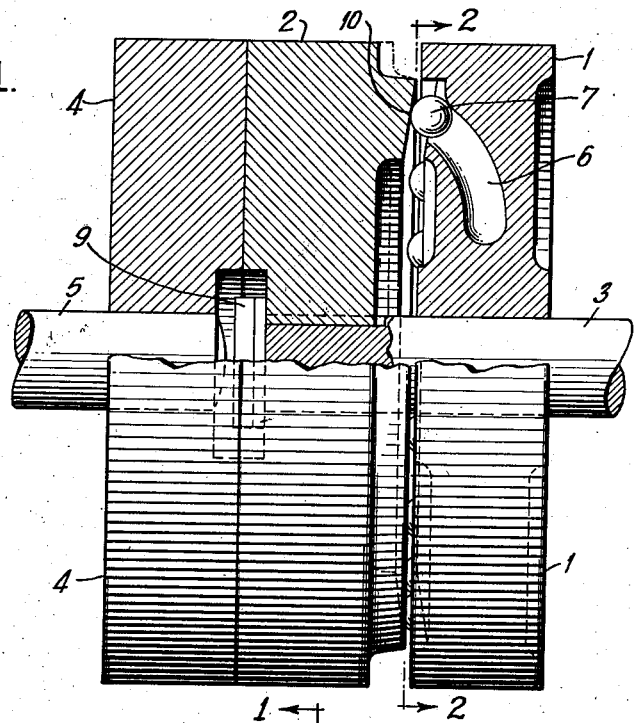

Referring first to Fig. 1 of the drawings, the mechanism consists of two disks or flywheels 1 and 2 mounted on a driving shaft 3. A clutch disk or flywheel 4 is mounted on a driven shaft 5 and is adapted to be engaged frictionally by the disk 2 for the transmission of driving force. In pockets 6 in the disk 1 is a set of rolling members in the form of balls 7. The disk 1 is rigidly attached to the driving shaft for rotation therewith and the disk 2, as shown in Figs. 3 and 4, is arranged to be driven by that shaft but may slide axially thereon against the action of a spring washer 8 located between the disk 2 and a shoulder 9 formed on the driving shaft. The clutch disk 4 is rigidly secured to the driven shaft and, in the diagrammatic arrangement shown, the adjacent faces of the disks 2 and 4 are constructed to constitute the driving surface of a friction clutch.

Figure 2:
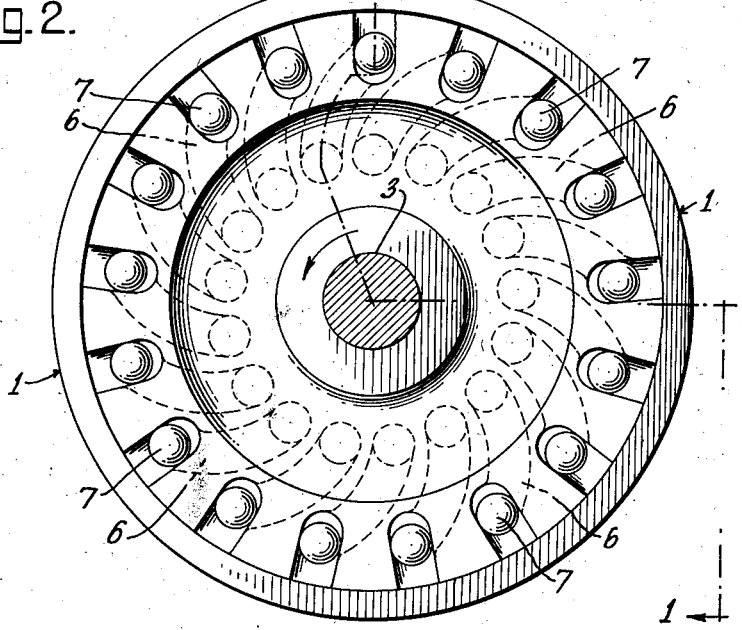

The pockets 6 preferably have the shape shown in Figs. 1 and 2, that is to say, they curve backwardly with respect to the direction of rotation shown by the arrow and also curve in an axial direction toward the disk 2.

The operation of the arrangement is that in the "at rest" condition the disks 2 and 4 are kept apart by the spring washer 8 and no driving connection between the two shafts exists. On rotation of the driving shaft, the balls 7 move outwardly under centrifugal action and engage with a cam surface 10 on the disk 2, the form of which is as shown and is such that the radial centrifugal force has a component in the axial direction tending to press the disk 2 into driving engagement with the disk 4, and a reactive force in the opposite direction acting on disk 1. The balls, which may conveniently be taken as seventeen in number, each have a weight of about 35 grams, and it is found that at a high speed rotation such as is obtained with an internal combustion engine the force tending to engage the clutch is sufficient to provide a driving connection capable of transmitting considerable power.

In order to achieve axial motion of the disk 2 upon the shaft 3 in a relatively free manner but substantially devoid of lost motion about the axis of rotation, the shaft 3 is formed with a plurality of grooves or splines 11, disposed at substantially equal intervals about the periphery of the shaft in the region adjacent the shoulder 9, while the bore of disk 2 has a corresponding number of feathers 12 for engagement with the splines. The curved pockets for the balls have a desired action both in starting and stopping the action of the clutch member. The backward curvature is seen to prevent the balls from flying out immediately under the influence of centrifugal force into contact with the cam surface of disk 2. The balls, in consequence, roll into place and bring about engagement between disks 2 and 4 with a gradually increasing force. As soon as the driving force on shaft 3 is shut off, the deceleration causes the curved pockets to apply a wedging action which effects the disengagement of the balls from the cam surface more quickly than the decrease in the centrifugal force.

On reduction in the speed of rotation, the centrifugal force is correspondingly reduced and the clutch is disengaged by the spring washer 8.

In the modified form of the invention shown in Fig. 5, the space between the disks 1 and 2 is sealed by a casing 15 and is, together with the pockets 6, filled or partly filled with oil, or other liquid, which, by centrifugal action, tends to increase the separating pressure on the disks 1 and 2.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. A centrifugal clutch mechanism comprising, in combination, a clutch disk arranged on one of two rotatable members for effecting a driving connection between said members, a pair of coupling disks mounted on and rotatable with the other of said members and one disk being axially slidable on its rotatable member and arranged on such sliding movement away from the other disk to cause engagement with said clutch disk, one of said coupling disks being also provided with a series of generally radially disposed pockets which are open at the outer end, said other coupling disk having a cam surface adjacent the open ends of said pockets, and a ball member disposed in each of said pockets and arranged to engage said cam surface under the influence of centrifugal force whereby said coupling disks are forced apart and the slidable one engages said clutch disk, each of said pockets having a curvature adapted to impart a desired acceleration to the movement of said ball members.

2. A centrifugal clutch mechanism comprising, in combination, a clutch disk arranged on one of two rotatable members for effecting a driving connection between said members, a pair of coupling disks mounted on and rotatable with the other of said members and one disk being axially slidable on its rotatable member and arranged on such sliding movement away from the other disk to cause engagement with said clutch disk, one of said coupling disks being provided with a series of pockets depending inwardly from open ends disposed at substantially equal intervals about the face of said disk, said pockets having a generally radial direction but curved slightly backwardly with respect to the direction of rotation, said other coupling disk having a cam surface adapted to produce when engaged an axial component of motion and disposed adjacent the open ends of said pockets, and a ball member in each of said pockets arranged when under the influence of centrifugal force to move into engagement with said cam surface and cause movement of the slidably mounted disk into engagement with said clutch disk.

3. A centrifugal clutch mechanism comprising, in combination, a clutch disk arranged on one of two rotatable members for effecting a driving connection between said members, a pair of coupling disks mounted on and rotatable with the other of said members and one disk being axially slidable on its rotatable member and arranged on such sliding movement away from the other disk to cause engagement with said clutch disk, one of said coupling disks being also provided with a series of generally radially disposed pockets which are open at the outer end but curved slightly backwardly with respect to the direction of rotation and also curved slightly in an axial direction, said other coupling disk having a cam surface adjacent the open ends of said pockets, and a ball member in each of said pockets arranged when under the influence of centrifugal force to move into engagement with said surface and cause movement of the slidably mounted disk into engagement with said clutch disk.

ROBERT RODGER GLEN.